United States Patent
Nelson

(10) Patent No.: US 6,599,061 B1
(45) Date of Patent: Jul. 29, 2003

(54) CUTTING INSERT WITH RADIALLY ALIGNED CHIP FORMING GROOVES

(75) Inventor: Joseph V. Nelson, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/641,197

(22) Filed: Aug. 17, 2000

(51) Int. Cl.[7] .......................... B23B 27/16; B23P 15/28
(52) U.S. Cl. ...................... 407/114; 407/115; 407/116
(58) Field of Search .............................. 407/113, 114, 407/115, 116, 117, 118, 119

(56) References Cited

U.S. PATENT DOCUMENTS

| | | | |
|---|---|---|---|
| 3,679,009 A | 7/1972 | Goodfellow | |
| 3,973,307 A | 8/1976 | McCreery et al. | |
| 4,215,957 A | 8/1980 | Holma et al. | |
| 4,359,300 A | 11/1982 | Hazra et al. | |
| 4,626,140 A | * 12/1986 | Zweekly et al. | 407/114 |
| 4,629,371 A | * 12/1986 | Maeda et al. | 407/114 |
| 4,844,668 A | * 7/1989 | Pettersson | 407/116 |
| 4,941,780 A | 7/1990 | Takahashi | |
| 4,969,779 A | 11/1990 | Barten | |
| 5,193,947 A | 3/1993 | Bernadic et al. | |
| 5,205,680 A | * 4/1993 | Lindstedt | 407/116 |
| 5,222,843 A | 6/1993 | Katbi et al. | |
| 5,230,591 A | 7/1993 | Katbi et al. | |
| 5,249,894 A | 10/1993 | Bernadic et al. | |
| 5,324,144 A | 6/1994 | Katbi et al. | |
| 5,342,151 A | * 8/1994 | Friedmann | 407/116 |
| 5,437,522 A | 8/1995 | Satran et al. | |
| 5,525,016 A | * 6/1996 | Paya et al. | 407/116 |
| 5,695,303 A | 12/1997 | Boianjiu et al. | |
| 5,772,365 A | * 6/1998 | Voget et al. | 407/42 |
| 6,164,879 A | * 12/2000 | Krenzer | 408/224 |
| 6,267,541 B1 | * 7/2001 | Isakov et al. | 407/114 |

FOREIGN PATENT DOCUMENTS

JP 59-1105 * 1/1984 ............. 407/114 X

* cited by examiner

Primary Examiner—Henry W. H. Tsai
(74) Attorney, Agent, or Firm—Larry R. Meenan

(57) ABSTRACT

A cutting insert includes an upper, lower and side surfaces and at least one cutting edge formed at an intersection of the upper surface with the side surface. A rake face of the insert is formed with one or more undulated chip forming grooves extending along the cutting edge and comprising a succession of alternating depressed and raised portions. Each depressed and raised portion is radially aligned with a central axis of the insert along the entire width of the chip forming groove.

20 Claims, 4 Drawing Sheets

CUTTING INSERT WITH RADIALLY ALIGNED CHIP FORMING GROOVES

FIELD OF THE INVENTION

The present invention pertains to a cutting insert to be used in cutting tools for chip-forming machining operations. More particularly, the present invention relates to a cutting insert having a top and bottom surfaces with radially aligned chip forming grooves for effective chip control.

BACKGROUND OF THE INVENTION

It is well known that in the design of cutting inserts and their mounting in a cutting tool, the provision of suitable cutting rake and relief clearance angles so as to ensure effective cutting with minimal energy consumption have to be balanced against undue weakening of the cutting edge. At the same time, provision must always be made for the effective removal of the chips generated in the cutting process. This latter requirement is particularly vital where the cutting tool operates in a very confined space, such as in a drilling operation.

The effective removal of the generated chips is to a large extent is dependant on the design of effective chip control to ensure that the generated chips are diverted from the cutting area by being deformed, split or broken into relatively short chips with minimal energy consumption and with effective heat dissipation.

To this end, it is well known to provide an insert with suitably formed depressions or grooves or with protrusions near the cutting edge which is designed to deform, split or break the chip with minimal energy consumption and with effective heat dissipation.

For example, U.S. Pat. No. 4,215,957 discloses a substantially flat rake surface of an insert which has a succession of depressions spaced along the cutting edge by substantially wide intermediate portions of the rake surface.

In U.S. Pat. No. 5,695,303, there is disclosed a cutting insert with undulating concave chip forming grooves comprising a succession of alternating depressed and raised portions extending in a direction perpendicular to the cutting edge along the entire width of the chip forming groove.

However, an effective control of chip orientation to a great extend depends on the positioning of the insert in the tool due to the specific shape of the chip forming groove and the smooth transitions between different portions thereof.

Thus, it may very often happen, particularly with cutting inserts positioned in a cutting tool at negative rake angles, that the chips cut by the cutting edge will be deflected in the direction towards, rather than away from a workpiece. Consequently, damage to the workpiece and tool chattering is possible. Thus, it would be desirable to provide an indexable cutting insert having a chip forming groove for providing effective chip control.

SUMMARY OF THE INVENTION

An object of the invention is to provide a cutting insert for use in a cutting tool having a chip forming groove for providing effective chip control.

It is another object of the invention to provide a double-sided indexable cutting insert having a chip forming groove enabling an effective chip control.

In one aspect of the invention, a cutting insert includes an upper surface, a lower surface and side surfaces. The cutting insert comprises at least one cutting edge formed at an intersection between the upper surface and one side surface. The at least one cutting edge extends between two adjacent cutting corners of the insert. The cutting insert also comprises at least one rake face adjacent the at least one cutting edge. The at least one rake face being formed with a first undulated chip forming groove extending along the at least one cutting edge and comprises alternating depressed and raised portions smoothly merging with one another. Each depressed and raised portion of the first chip forming groove is radially aligned with a central axis of the insert.

In another aspect of the invention, a cutting insert has an upper surface, a lower surface and side surfaces. The cutting insert comprises at least one cutting edge formed at an intersection between the upper surface and one side surface, at least one rake face adjacent the at least one cutting edge, a first undulated chip forming groove being formed on the at least one rake face and extending along the at least one cutting edge, a seating surface projecting above the cutting corners of the insert, and a second undulated chip forming groove extending along said seating surface. The first and second undulated chip forming grooves comprise alternating depressed and raised portions smoothly merging with one another, wherein each depressed and raised portion of the first and second chip forming grooves is radially aligned with a central axis of the insert.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
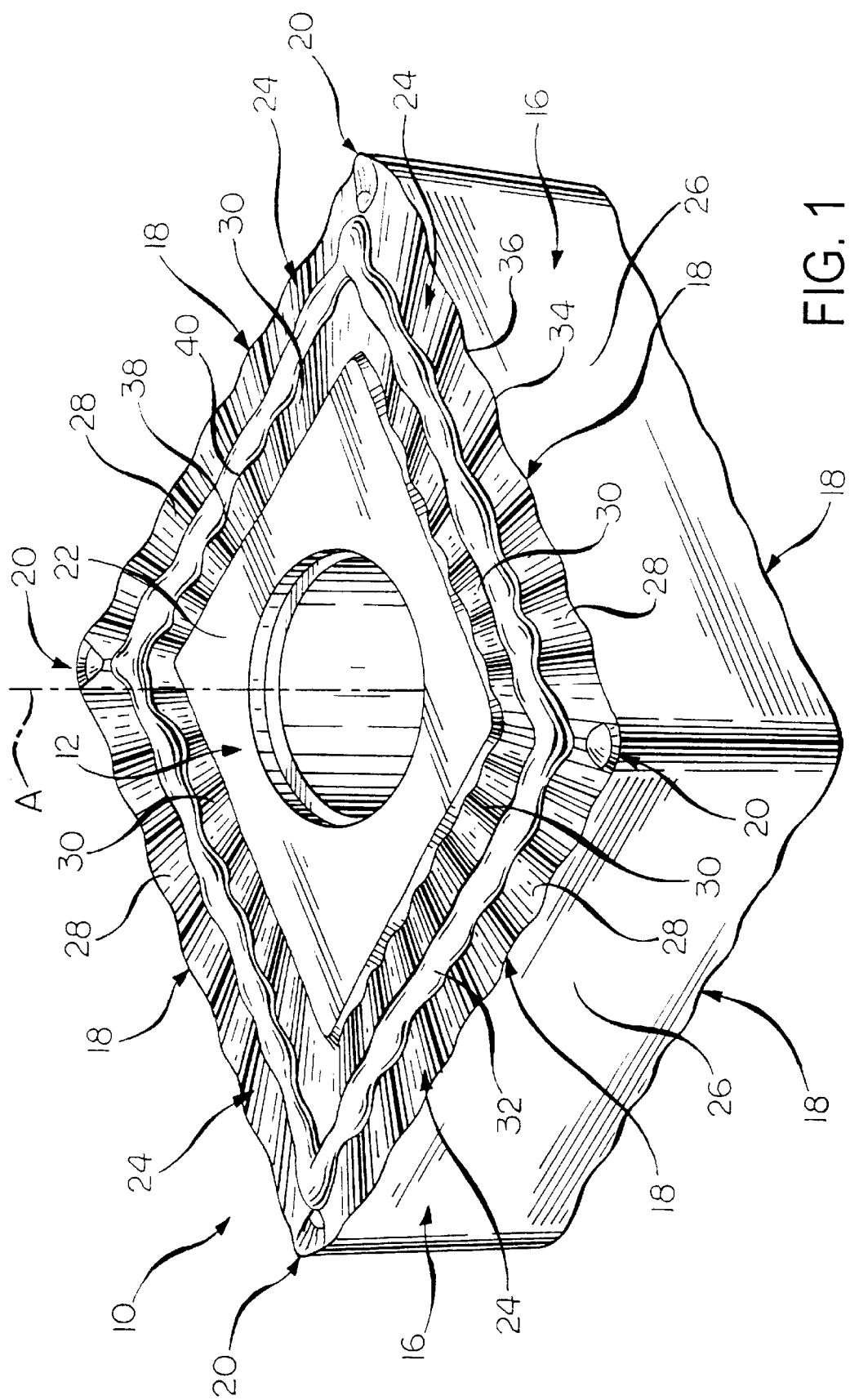
FIG. 1 is a perspective view of a cutting insert in accordance with the invention.
Figure 2:
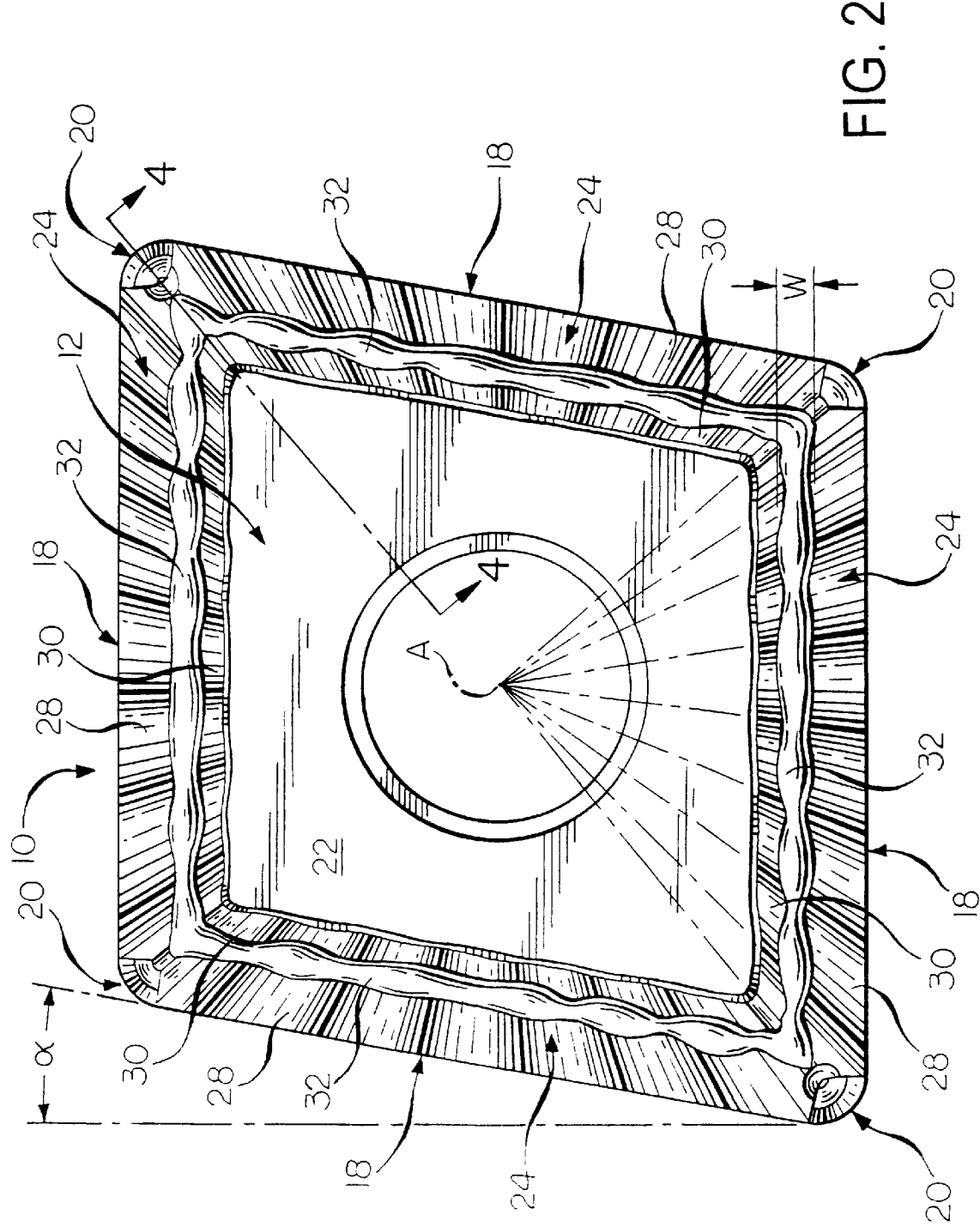
FIG. 2 is a top plan view of the cutting insert in accordance with the invention.
Figure 3:
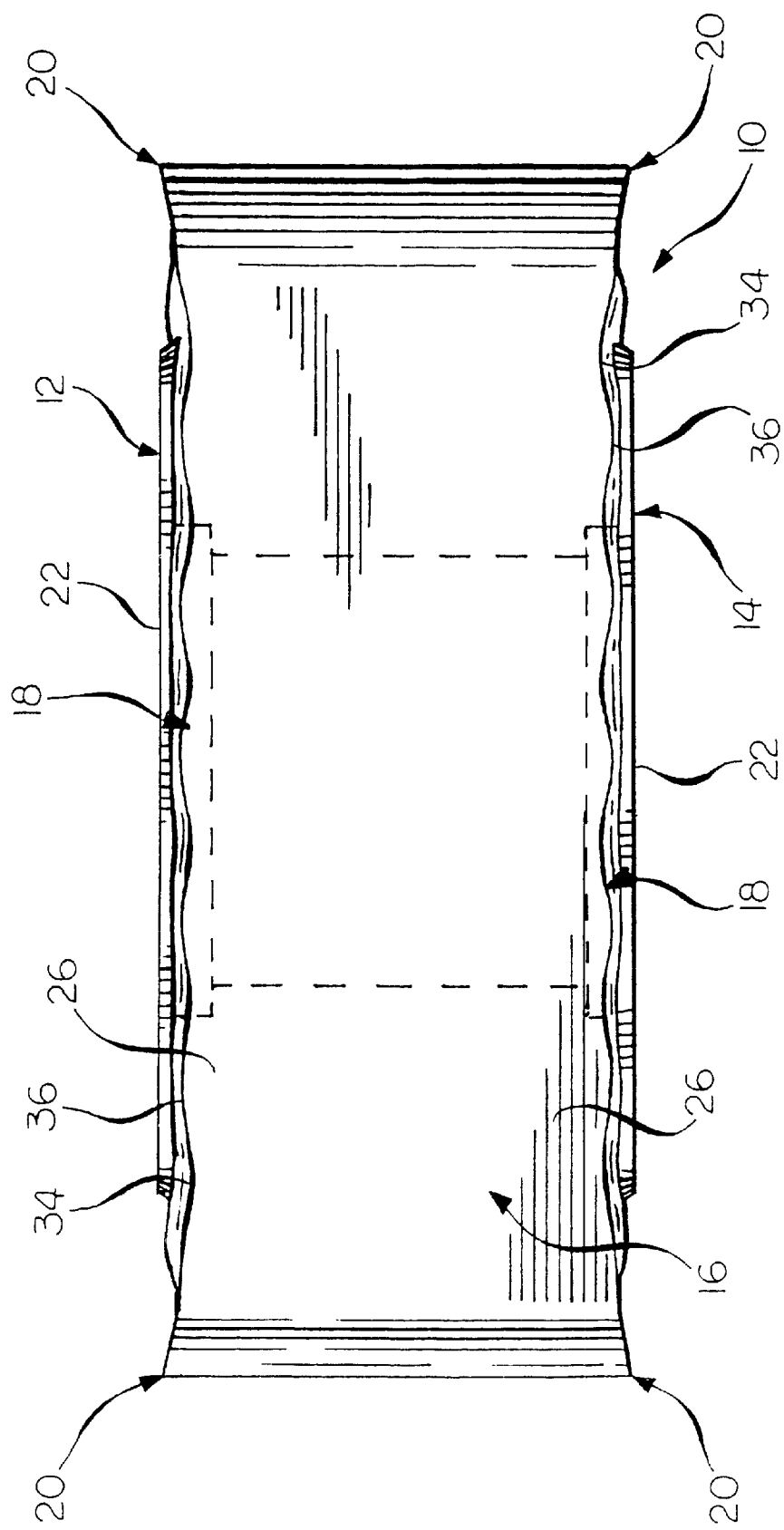
FIG. 3 is a side elevational view of the cutting insert in accordance with the invention.

One embodiment of a cutting insert 10 having a chip forming groove enabling an effective chip control is shown in FIGS. 1–3. The cutting insert 10 has generally an upper surface 12, a lower surface 14 and side surfaces 16. Four cutting edges 18 are formed at the intersection between the upper surface 12 or the lower surface 14 with the side surface 16. In addition, four cutting corners 20 are formed at the intersection between two adjacent cutting edges 18. Each of the upper and lower cutting edges 18 can be indexed into an active position and effectively utilized in a cutting tool (not shown).

The cutting insert 10 is of a generally equilateral parallelogram having an 80° diamond configuration. In other words, one side surface 16 has an angle, $\alpha$, of approximately 10° with respect to an adjacent side surface 16, as best shown in FIG. 2.

The upper and lower surfaces 12, 14 of the insert 10 are formed with a centrally disposed, substantially planar seating surface 22 which projects above the cutting corners 20 by a height which is preferably in the range of 0.05 mm to 0.40 mm. The seating surface 22 serves as an insert support seating surface when the insert 10 is positioned in the cutting tool.

The regions of the upper and lower surface 12, 14 and the side surface 16 adjacent each cutting edge 18 constitute rake faces 24 and relief flanks 26 of the insert 10, respectively. Each relief flank 26 is preferably planar. Each rake face 24 is formed with a first chip forming groove 28 extending along the cutting edges 18 and a second chip forming groove 30 extending along the seating surface 22 separated from the first chip forming groove 28 by an intermediate portion 32. The chip forming grooves 28 and 30 may have a width, W, which may vary in the direction along the cutting edges 18 and the seating surface 22. In illustrated embodiment, the width of the chip forming grooves 28 and 30 are in the range of about 0.001 inches to 0.25 inches.

The chip forming grooves 28 and 30 are undulated along the direction of the cutting edges 18 and seating surface 22, respectively. Specifically, the undulations of the first chip forming groove 28 comprise a succession of depressed portions 34 merging smoothly and spaced from one another by raised portions 36 to form a serrated cutting edge 18. Similarly, the undulations of the second chip forming groove 30 comprise a succession of depressed portions 38 merging smoothly and spaced from one another by raised portions 40. Preferably, the depressed and raised portions 34, 36, 38 and 40 extend outwardly in radial alignment with a central axis, A, of the insert 10, as indicated by the dashed lines in FIG. 2. By extending the depressed and raised portions 34, 36, 38 and 40 in radial alignment with the central axis, A, chip removal is greatly facilitated as compared to conventional cutting inserts in which the depressed and raised portions are substantially perpendicular to the cutting edge.

In the illustrated embodiment, the insert 10 has six depressed and raised portions 34, 36 along each cutting edge 18 having a length of about 0.50 inches. However, the number (frequency) of depressed and raised portions 34, 36, 38 and 40 of the first and second chip forming grooves 28 and 30 may vary depending on the length along each cutting edge 18. In other words, a cutting insert having a longer cutting edge would have a greater number of depressed and raised portions than a cutting insert having a shorter cutting edge. Thus, the insert 10 can have as few as one (1) and as many as thirty (30) depressed and raised portions 34, 36, 38 and 40 along each cutting edge 18.

In the illustration embodiment, the depressed portions 34 and 38 have a radius of approximately 0.060 inches and the raised portions 36, 40 have a radius of approximately 0.075 inches. However, the number of depressed and raised portions 34, 36, 38 and 40 of the first and second chip forming grooves 28 and 30 may also vary depending on the radius (amplitude) of the depressed and raised portions 34, 36, 38 and 40. In other words, a cutting insert with a larger radius for the raised and/or depressed portions will have a fewer number of depressed and raised portions along the length of each cutting edge than a cutting insert with a smaller radius for the raised and/or depressed portions. Thus, the radius of the depressed and raise portions 34, 36, 38 and 40 of the insert 10 can be within the range of approximately 0.020 to 0.188 inches.

Figure 4:
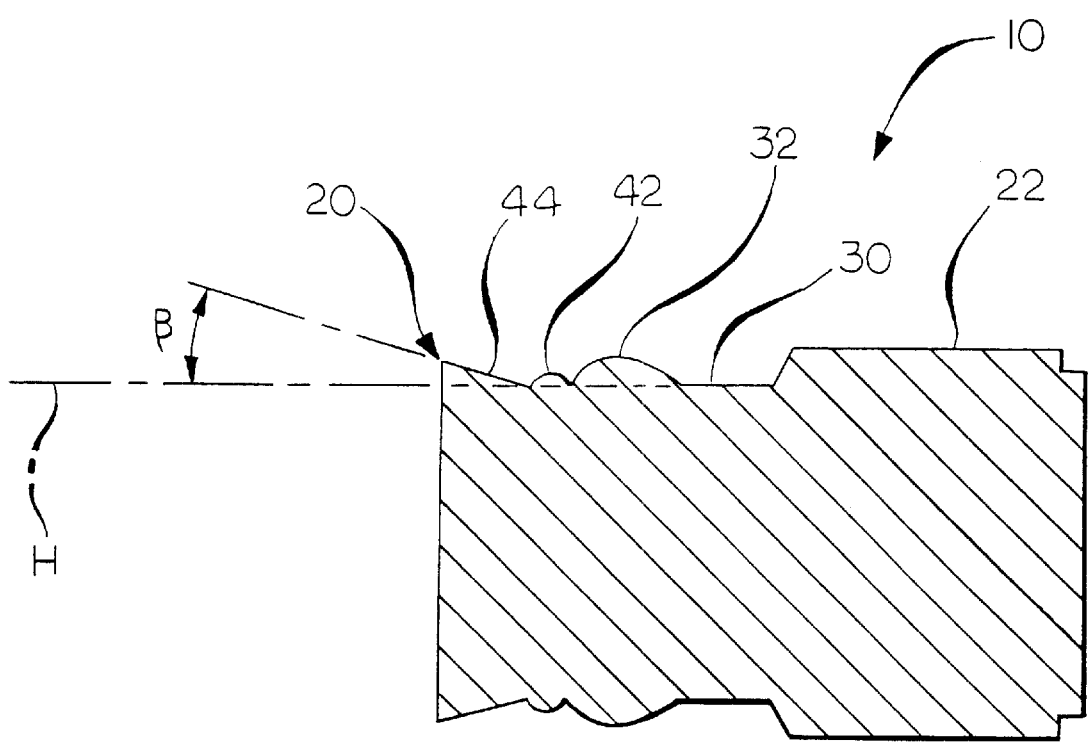
FIG. 4 is a cross section view of the cutting insert taken along line 4—4 of FIG. 2.

Referring now to FIG. 4, the cross-sectional shape of the seating surface 22, the chip forming groove 30, the intermediate portion 32, a first ramp portion 42, a second ramp portion 44, and the cutting corner 20 is shown. It can be seen that the depth of the of the chip forming groove 30 with respect to the cutting corner 20 is preferably in the range of 0.001 inches to 0.075 inches. It will be noted that the profile for the chip forming groove 28 is similar to the chip forming groove 30.

The intermediate portion 32 preferably has a profile which is generally tear drop in shape with a gradual increase in height from the second chip forming groove 30 to approximately the same height as the cutting corner 20. The tear drop shape of the intermediate portion 32 facilitates in the chip breakage and removal of the insert 10. However, it will be appreciated that the intermediate portion 32 may have any desired profile shape. In the illustrated embodiment, the intermediate portion 32 reaches a height of approximately 0.001 inches lower than the height of the cutting corner 20.

In the illustrated embodiment, the first ramp portion 42 also has a profile which is tear drop in shape to facilitate chip breakage and removal, similar to the intermediate portion 32. However, it will be appreciated that the first ramp portion 42 may have any desired profile shape. The second ramp portion 44 has a substantially linear profile that increases in height from the first ramp portion 42 to the cutting corner 20. Preferably, the linear profile of the second ramp portion 44 forms an angle, $\beta$, of about 18 degrees which respect to a horizontal axis, H, of the insert 10. 10. However, it will be appreciated that the invention is not limited by the angle, $\beta$, and that the invention can be practiced with any desired angle.

As shown in FIG. 4, the seating surface 22 is higher in elevation than the cutting edges 18 and the cutting corner 20. In the illustrated embodiment, the seating surface 22 is in the range of approximately 0.005 inches to 0.006 inches higher in elevation than the cutting edges 18 and the cutting corner 20.

It should be noted that the shape of the chip forming grooves 28 and 30 can vary in the direction along the cutting edge 18. In addition, the specific shape and dimensions of the insert 10 may vary depending on materials to be machined. Thus, the insert 10 can have a shape other than the parallelogram shape of the illustrated embodiment. For example, the insert may be square, trigon, octagon, and any other desired shape. Further, the insert 10 may be single-sided and/or have relief flank geometry of any suitable type.

The patents and publications referred to herein are hereby incorporated by reference.

Having described presently preferred embodiments the invention may be otherwise embodied within the scope of the appended claims.

What is claimed is:

1. A cutting insert having an upper surface, a lower surface and side surfaces, said insert comprising:

at least one cutting edge formed at an intersection between the upper surface and one side surface, said at least one cutting edge extending between two adjacent cutting corners of said insert; and at least one rake face adjacent said at least one cutting edge, said at least one rake face being formed with a first undulated chip forming groove extending along said at least one cutting edge and comprising alternating depressed and raised portions smoothly merging with one another and extending from said side surface through said at least one cutting edge and, wherein each depressed and raised portion of the first chip forming groove is radially aligned with a central axis of said insert.

2. A cutting insert according to claim 1, wherein a dimension of said depressed and raised portions in a direction perpendicular to said at least one cutting edge defines a width of the first chip forming groove.

3. A cutting insert according to claim 1, further including a seating surface projecting above the cutting corners of said insert.

4. A cutting insert according to claim 3, further comprises a second undulated chip forming groove extending along said seating surface and comprising alternating depressed and raised portions smoothly merging with one another.

5. A cutting insert according to claim 4, wherein each depressed and raised portion of the second chip forming groove is radially aligned with a central axis of said insert.

6. A cutting insert according to claim 4, further comprising an intermediate portion between the first and second undulated chip forming grooves.

7. A cutting insert according to claim 6, wherein said intermediate portion has a profile that is generally tear drop in shape.

8. A cutting insert according to claim 1, wherein said cutting insert is a double-sided indexable cutting insert of a diamond shape.

9. A cutting insert according to claim 8, wherein said insert includes a plurality of cutting edges formed at intersections of the side surfaces with the upper and lower surfaces of said insert.

10. A cutting insert having an upper surface, a lower surface and side surface, said insert comprising:
- at least one cutting edge formed at an intersection between the upper surface and one side surface, said at least one cutting edge extending between two adjacent cutting corners of said insert;
- at least one rake face adjacent said at least one cutting edge;
- a first undulated chip forming groove being formed on said at least one rake face and extending along said at least one cutting edge, said first undulated chip forming groove comprising alternating depressed and raised portions smoothly merging with one another and extending from said side surface through said at least one cutting edge and;
- a seating surface projecting above the cutting corners of said insert; and
- a second undulated chip forming groove extending along said seating surface, said second undulated chip forming groove comprising alternating depressed and raised portions smoothly merging with one another, wherein each depressed and raised portion of the first and second chip forming grooves is radially aligned with a central axis of said insert.

11. A cutting insert according to claim 10, wherein a dimension of said depressed and raised portions in a direction perpendicular to said at least one cutting edge defines a width of the first and second chip forming grooves.

12. A cutting insert according to claim 10, wherein said cutting insert is a double-sided indexable cutting insert of a diamond shape.

13. A cutting insert according to claim 10, further comprising an intermediate portion between the first and second undulated chip forming grooves.

14. A cutting insert according to claim 13, wherein said intermediate portion has a profile that is generally tear drop in shape.

15. A cutting insert according to claim 10, wherein said cutting insert is a double-sided indexable cutting insert of a diamond shape.

16. A cutting insert according to claim 15, wherein said insert includes a plurality of cutting edges formed at intersections of the side surfaces with the upper and lower surfaces of said insert.

17. A cutting insert having a central axis, an upper surface, a lower surface and side surface, said insert comprising:
- a first undulated chip forming groove formed on the upper surface at a first radial distance from the central axis, said first undulated chip forming groove comprising alternating depressed and raised portions; and
- a second undulated chip forming groove formed on the upper surface at a second radial distance from the central axis, the second radial distance being different than the first radial distance, said second undulated chip forming groove comprising alternating depressed and raised portions, wherein each depressed and raised portion of the first and second chip forming grooves is radially aligned with the central axis of said insert.

18. A cutting insert according to claim 17, further comprising a seating surface centrally disposed about the central axis of said insert.

19. A cutting insert according to claim 17, further comprising an intermediate portion between the first and second chip forming grooves.

20. A cutting insert according to claim 19, wherein said intermediate portion has a profile that is generally tear drop in shape.

* * * * *